(12) United States Patent  
Boger et al.

(10) Patent No.: US 12,323,249 B2
(45) Date of Patent: *Jun. 3, 2025

(54) BLOCK ACKNOWLEDGMENT FOR A MULTICAST TRANSMISSION WITH MULTIPLE CONCURRENT STREAMS

(71) Applicant: Apple Inc., Cupertino, CA (US)

(72) Inventors: Yoel Boger, Shoham (IL); Ido Shani, Shoham (IL); Koby Vainapel, Herzliya (IL); Leor Kehaty, Givataim (IL); Marcelo Senter, Shoham (IL); Guoqing Li, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,003

(22) Filed: Mar. 25, 2024

(65) Prior Publication Data

US 2024/0235739 A1 Jul. 11, 2024

Related U.S. Application Data

(63) Continuation of application No. 17/232,055, filed on Apr. 15, 2021, now Pat. No. 11,943,054.

(Continued)

(51) Int. Cl.
*H04W 84/12* (2009.01)
*H04L 1/1607* (2023.01)
(Continued)

(52) U.S. Cl.
CPC ........ *H04L 1/1621* (2013.01); *H04L 12/1886* (2013.01); *H04L 47/2483* (2013.01)

(58) Field of Classification Search
CPC .... H04W 4/06; H04L 1/1621; H04L 12/1886; H04L 47/2483; H04L 1/1614;
(Continued)

(56) References Cited

U.S. PATENT DOCUMENTS 10,230,435 B2 * 3/2019 Kim .......................... H04L 1/06
10,368,255 B2 * 7/2019 Gunasekara .......... H04W 48/18
(Continued)

FOREIGN PATENT DOCUMENTS

CN 105706386 A 6/2016
CN 107710660 A 2/2018

OTHER PUBLICATIONS

Chinese Office Action from Chinese Patent Application No. 202110412477.0, dated Aug. 10, 2022, 15 pages including machine-generated English language translation.

(Continued)

*Primary Examiner* — Atique Ahmed
(74) *Attorney, Agent, or Firm* — BAKERHOSTETLER (57) ABSTRACT

The subject technology provides for block acknowledgment requests and block acknowledgment frames that can be used in conjunction with multicast transmissions that include multiple concurrent streams. Thus, the subject technology reduces the overhead associated with multicast transmissions that include multiple concurrent streams by aggregating the acknowledgments across multiple streams into a block acknowledgment, thereby increasing the effective throughput of such transmissions and overall network efficiency.

20 Claims, 7 Drawing Sheets

Related U.S. Application Data (60) Provisional application No. 63/012,025, filed on Apr. 17, 2020.

(51) Int. Cl.
    *H04L 12/18*     (2006.01)
    *H04L 47/2483*     (2022.01)

(58) Field of Classification Search
    CPC ... H04L 1/1685; H04L 2/189; H04L 47/2466; H04L 2001/0083; H04L 12/1872
    See application file for complete search history.

(56) References Cited

U.S. PATENT DOCUMENTS

| | | |
|---|---|---|
| 10,581,627 B1 | 3/2020 | Jiang |
| 2005/0135284 A1 | 6/2005 | Nanda |
| 2005/0135318 A1 | 6/2005 | Walton |
| 2006/0034274 A1 | 2/2006 | Kakani |
| 2006/0200496 A1* | 9/2006 | Okman ................. G06Q 10/06 |
| 2007/0250212 A1* | 10/2007 | Halloran ................. A47L 9/009 901/1 |
| 2009/0031185 A1* | 1/2009 | Xhafa ................... H04L 1/1819 714/751 |
| 2009/0279470 A1 | 11/2009 | Seok |
| 2011/0096710 A1* | 4/2011 | Liu ....................... H04L 1/1614 370/312 |
| 2012/0263091 A1* | 10/2012 | Kim ......................... H04L 1/06 370/312 |
| 2013/0100952 A1 | 4/2013 | Hart |
| 2014/0140213 A1* | 5/2014 | Raleigh ................. H04L 65/752 370/235 |
| 2014/0241333 A1* | 8/2014 | Kim ....................... H04W 48/16 370/338 |
| 2015/0172757 A1 | 6/2015 | Kafle |
| 2016/0330714 A1 | 11/2016 | Hedayat |
| 2017/0005709 A1 | 1/2017 | Li |
| 2017/0026431 A1 | 1/2017 | Oren |
| 2017/0366310 A1 | 12/2017 | Verma |
| 2018/0262936 A1* | 9/2018 | Zhou ..................... H04J 11/0053 |
| 2018/0263045 A1* | 9/2018 | Zhou ..................... H04W 72/12 |
| 2019/0253194 A1 | 8/2019 | Jiang |
| 2020/0288523 A1* | 9/2020 | Patil ...................... H04W 80/02 |
| 2021/0288735 A1* | 9/2021 | Yamagishi ............. H04H 60/37 |
| 2021/0399838 A1 | 12/2021 | Lou |

OTHER PUBLICATIONS

Chinese Office Action from Chinese Patent Application No. 202110412477.0, dated Mar. 9, 2022, 13 pages including machine-generated English language translation.

Indian Office Action from Indian Patent Application No. 202114017736, dated Feb. 14, 2022, 5 pages.

* cited by examiner

| BAR/BA TYPE | BA VARIANT |
| --- | --- |
| 0 | BASIC |
| 1 | EXTENDED COMPRESSED |
| 2 | COMPRESSED |
| 3 | MULTI TID |
| 4-5 | RESERVED |
| 6 | GCR |
| 7 | M-TID GCR |
| 8-9 | RESERVED |
| 10 | GLK-GCR |
| 11 | MULTI STA |
| 12-15 | RESERVED |

BLOCK ACKNOWLEDGMENT FOR A MULTICAST TRANSMISSION WITH MULTIPLE CONCURRENT STREAMS

CROSS REFERENCE TO RELATED APPLICATIONS

This application is a continuation of U.S. patent application Ser. No. 17/232,055, entitled "BLOCK ACKNOWLEDGMENT FOR A MULTICAST TRANSMISSION WITH MULTIPLE CONCURRENT STREAMS," filed on Apr. 15, 2021, which claims the benefit of priority to U.S. Provisional Patent Application No. 63/012,025, entitled "Block Acknowledgment for a Multicast Transmission with Multiple Concurrent Streams," filed on Apr. 17, 2020, the disclosure of each of which is hereby incorporated herein in its entirety.

TECHNICAL FIELD

The present description relates generally to utilizing block acknowledgements for a multicast transmission, including utilizing block acknowledgments for a multicast transmission with multiple concurrent streams, e.g., a multicast transmission with multiple traffic identifiers.

BACKGROUND

A block acknowledgment allows multiple frames (or other data transmission units) to be acknowledged together using a single acknowledgment frame.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Wireless communication technologies may utilize block acknowledgements to reduce overhead and increase effective throughput. For example, a block acknowledgment frame may be used to acknowledge several previously transmitted frames, instead of an acknowledgment frame that acknowledges only one previously transmitted frame. Similarly multicast transmissions may be used to transmit a given frame to multiple different recipients. One example of a multicast transmission may be a groupcast with retries (GCR) transmission, where retransmissions are group addressed. Although multicast transmissions may be intended for multiple different recipients, multicast transmissions may also utilize block acknowledgments, such as to improve effective network throughput.

Wireless communication technologies may also improve effective throughput by aggregating frames from multiple streams, such as packets classified by different traffic identifiers (TIDs), e.g., from the same or different quality of service (QOS) access categories. In one or more implementations, a traffic identifier may be considered an identifier that can be used to classify a packet. For example, a packet classified as audio (and/or video) may be given higher priority than, for example, a packet classified as a data frame. The ability to aggregate frames across different QoS traffic classes (e.g., different streams/TIDs) may allow transmissions to be aggregated more efficiently and thereby reduce overhead. In one or more implementations, each TID may represent a different source of data information, each potentially having a distinct priority.

The efficiencies achieved through multicast transmissions, and those achieved through transmitting multiple concurrent streams may be enhanced by combining multicast transmissions with transmissions of multiple concurrent streams (e.g., multiple TID transmissions), such as a multiple TID GCR transmission. Furthermore, the efficiencies achieved through the use of block acknowledgments and those achieved through the use of multicast transmissions that include multiple concurrent streams may be enhanced by utilizing block acknowledgments in conjunction with multicast transmissions that include multiple concurrent streams.

The subject system provides for block acknowledgment requests and block acknowledgment frames that can be used in conjunction with multicast transmissions that include multiple concurrent streams, e.g. a multiple TID GCR transmission and/or session. Thus, the subject system reduces the overhead associated with multicast transmissions that include multiple concurrent streams, thereby increasing the effective throughput of such transmissions and overall network efficiency.

Figure 1:
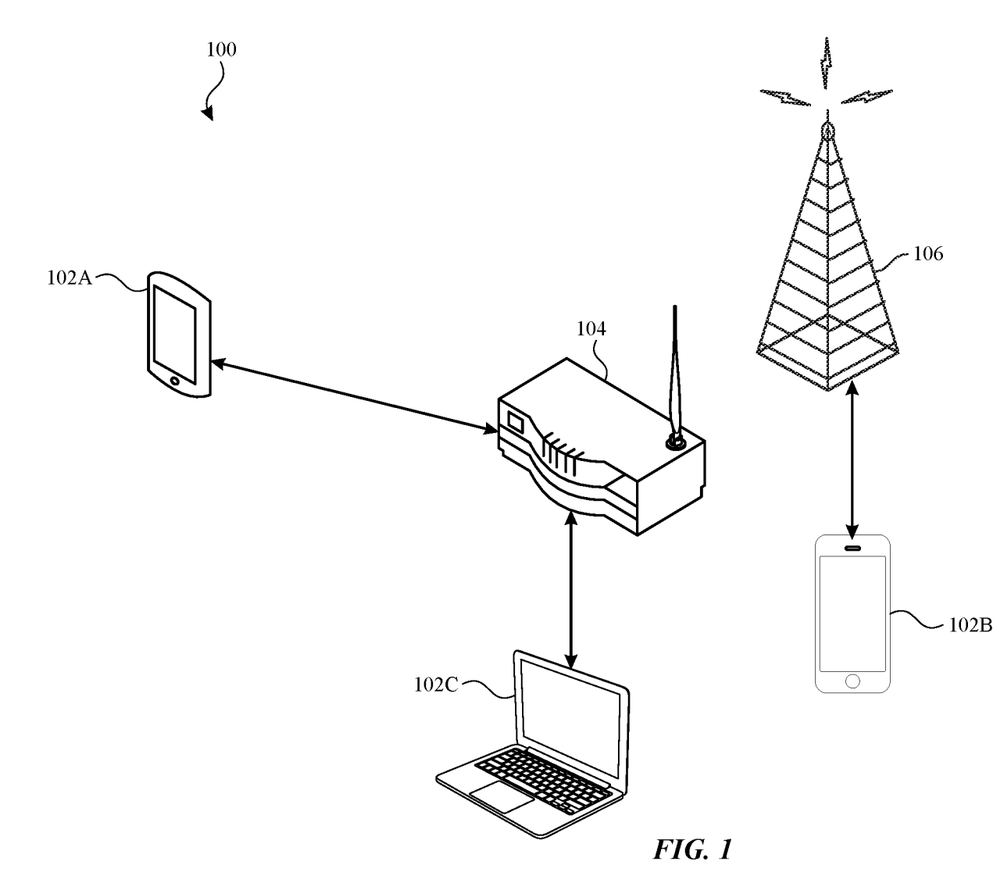
FIG. 1 illustrates an example network environment in which block acknowledgments for a multicast transmission with multiple concurrent streams may be utilized in accordance with one or more implementations.

FIG. 1 illustrates an example network environment in which block acknowledgments for a multicast transmission with multiple concurrent streams may be utilized for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a wireless access point 104, and a base station 106. One or more of the electronic devices 102A-C may include, may be a component of, and/or may be referred to as, a User Equipment (UE), station (STA), or terminal device. One or more of the electronic devices 102A-C may include suitable logic, circuitry, interfaces, memory, and/or code that enables communications, e.g., with one or more of the wireless access point 104 or the base station 106, via wireless interfaces and utilizing one or more radio transceivers, such as WiFi and/or cellular transceivers. One or more of the electronic devices 102A-C may also be operable to communicate wirelessly with one or more other user devices, one or more other base stations, and/or one or more other access points not shown in FIG. 1.

One or more of the electronic devices 102A-C may be, for example, a portable computing device such as a laptop device, a smartphone, a peripheral device (e.g., a digital camera, headphones), a smart television device, a tablet device, a wearable device such as a watch, a band, and the like, or any other appropriate device that includes, for example, one or more wireless interfaces, such as wireless local area network (WLAN) radios, Wi-Fi radios, cellular radios, Bluetooth radios, Zigbee radios, near field communication (NFC) radios, and/or other wireless radios. In FIG. 1, by way of example, the electronic device 102A is depicted as a tablet device, the electronic device 102B is depicted as a mobile device, and the electronic device 102C is depicted as a laptop device. One or more of the electronic devices 102A-C may be, and/or may include all or part of, the electronic device discussed below with respect to FIG. 2, and/or the electronic system discussed below with respect to FIG. 7.

The base station 106 may be a component of, and/or may be referred to as, a cell, a node B (NB), an evolved universal mobile telecommunications system (UMTS) terrestrial radio access network (E-UTRAN) node B, an evolved nodeB (eNodeB or eNB), and the like. The base station 106 may include suitable logic, circuitry, interfaces, memory, and/or code that enable cellular communications, e.g., with one or more of the electronic devices 102A-C and/or other base stations (not shown), via wireless interfaces and utilize one or more radio transceivers.

In one or more implementations, the base station 106 may be a base station of a cellular-based wireless network, such as a long term evolution (LTE) communications network, global system for mobile (GSM) communications network, UMTS communications network, or generally any cellular-based communications network. The base station 106 may utilize an unlicensed spectrum for cellular communications, such as in a carrier aggregation procedure, e.g., in licensed assisted access (LAA) communication. Thus, the cellular communications may include communications over licensed spectrum, such as spectrum licensed by the mobile network operator associated with the base station 106, and/or communications over unlicensed spectrum, such as, for example, the 5 GHz spectrum. The base station 106 may be, and/or may include all or part of, the electronic device discussed below with respect to FIG. 2, and/or the electronic system discussed below with respect to FIG. 6.

The wireless access point 104 may include, may be a component of, and/or may be referred to as, a WLAN access point. The wireless access point 104 includes suitable logic, circuitry, interfaces, memory, and/or code that enable WiFi communications, e.g., with one or more of the electronic devices 102A-C via wireless interfaces and utilize one or more radio transceivers. The WiFi communications may include communications over one or more of a 2.4 GHz spectrum, a 5 GHz spectrum, a 60 GHz spectrum, and/or other spectrums utilized for WiFi communications. The wireless access point 104 may be, and/or may include all or part of, the electronic device discussed below with respect to FIG. 2, and/or the electronic system discussed below with respect to FIG. 7.

In FIG. 1, the electronic device 102B is illustrated as participating in cellular communications with the base station 106. However, the electronic device 102B may also participate in WiFi communications with the wireless access point 104, such as concurrently with the cellular communications with the base station 106. In one or more implementations, the electronic device 102B may participate in a licensed assisted access procedure with the base station 106 in order to utilize unlicensed spectrum (e.g., spectrum that is not licensed by any mobile network operator) for cellular communications, such as via carrier aggregation. Thus, if the electronic device 102B is located near one or more of the electronic devices 102A,C that are utilizing the 5 GHz spectrum for WiFi communications, e.g. with the wireless access point 104, the WiFi communications of the electronic devices 102A,C on the 5 GHz spectrum may interfere with the cellular communications of the electronic device 102B on the 5 GHz spectrum (and vice-versa).

In the subject system one or more of the electronic devices 102A-C, the wireless access point 104, and/or the base station 106 may utilize block acknowledgements for a multicast transmission that includes multiple concurrent streams. An example process for utilizing block acknowledgments for a multicast transmission that includes multiple concurrent streams is discussed further below with respect to FIG. 3. An example of a block acknowledgement type that may be utilized for block acknowledgments for a multicast transmission that includes multiple concurrent streams is discussed further below with respect to FIG. 4. Furthermore, an example frame format for a block acknowledgment request for a multicast transmission that includes multiple concurrent streams is discussed further below with respect to FIG. 5, and a corresponding block acknowledgment frame format is discussed further below with respect to FIG. 6.

Figure 2:
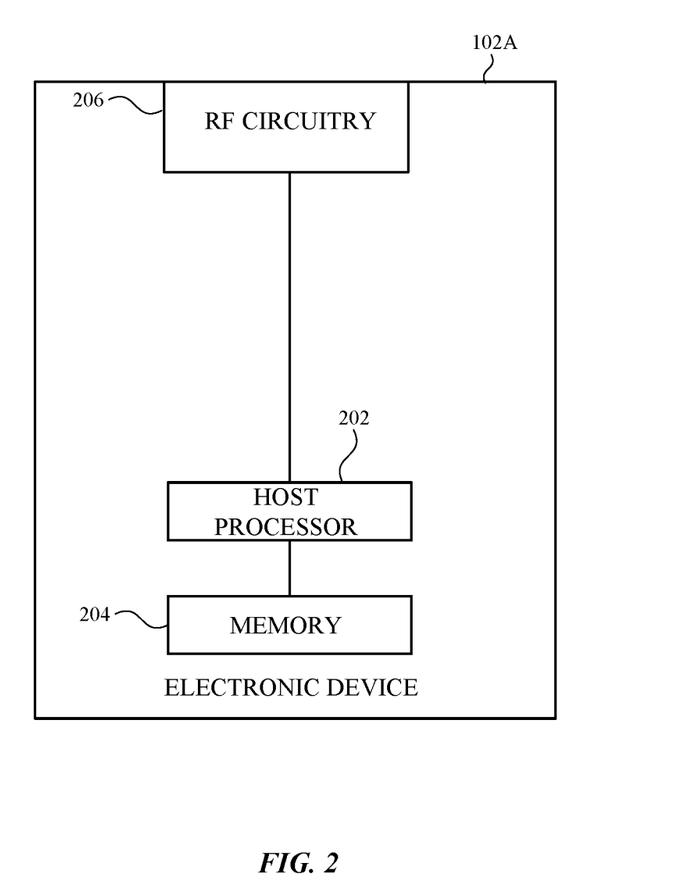
FIG. 2 illustrates an example electronic device that may be used in accordance with one or more implementations.

FIG. 2 illustrates an example electronic device 102A that may be used in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more the electronic devices 102B-C, the wireless access point 104, and/or the base station 106.

The electronic device 102A may include, among other components, a host processor 202, a memory 204, and RF circuitry 206. The RF circuitry 206 may include channel occupancy detection circuitry 208. The host processor 202, which may also be referred to as an application processor or a processor, may include suitable logic, circuitry, and/or code that enables processing data and/or controlling operations of the electronic device 102A. In this regard, the host processor 202 may be enabled to provide control signals to various other components of the electronic device 102A.

The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The RF circuitry 206 may include suitable logic circuitry and/or code that may be operable to transmit and receive one or more types of wireless signals, such as WiFi signals, cellular signals, and the like. For example, the RF circuitry 206 may include an RF front end, a baseband processor, and/or one or more other components that facilitate wireless communications.

In one or more implementations, one or more of the host processor 202, the memory 204, the RF circuitry 206, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
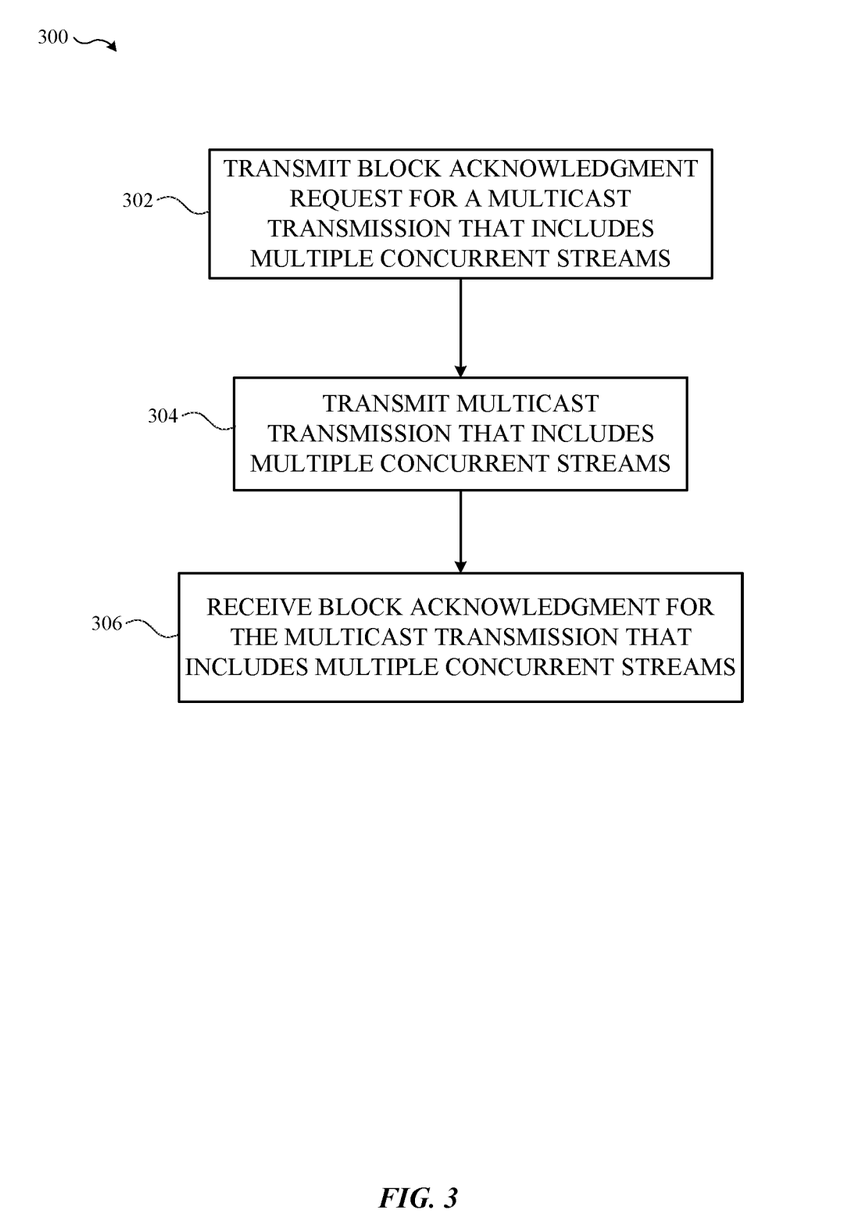
FIG. 3 illustrates a flow diagram of an example process of utilizing block acknowledgments for a multicast transmission that includes multiple concurrent streams in accordance with one or more implementations.

FIG. 3 illustrates a flow diagram of an example process 300 of utilizing block acknowledgments for a multicast transmission that includes multiple concurrent streams in accordance with one or more implementations. For explanatory purposes, the process 300 is primarily described herein with reference to the electronic device 102A of FIG. 1. However, the process 300 is not limited to the electronic device 102A of FIG. 1, and one or more blocks (or operations) of the process 300 may be performed by one or more components or chips of the electronic device 102A. The electronic device 102A is also presented as an exemplary device and the operations described herein may be performed by any suitable device, such as one or more of the electronic devices 102B-C, the wireless access point 104, and/or the base station 106. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may be initiated when the electronic device 102A transmits a block acknowledgment request for a multicast transmission that includes multiple concurrent streams (102), such as the block acknowledgment request discussed further below with respect to FIG. 5. For example, one or more other electronic devices may have registered for a multicast transmission from the electronic device 102A, such as by registering for a particular multicast address and/or GCR address. The electronic device 102A may use the multicast registrations to populate a data structure, such as a table or any other data structure, that is used to track which of the registered electronic devices have acknowledged which multicast frames.

For example, the electronic device 102A may identify multicast frames to be transmitted that include multiple different streams (or traffic identifiers), and may then send the block acknowledgment request in advance of the corresponding multicast transmission. The block acknowledgment request may identify a respective set (or range) of frames (e.g., a starting sequence number and an ending sequence number) to be transmitted for each respective stream of the corresponding multicast transmission. The transmitted block acknowledgment request may be received by one or more of the electronic devices that registered for the multicast transmission. In one or more implementations, multiple block acknowledgment requests may be transmitted for a given multicast transmission.

The electronic device 102A then transmits the multicast transmission that includes multiple concurrent streams (304). For example, the electronic device 102A may transmit multiple multicast frames using the corresponding multicast address, such as by setting the destination address of the frames to the multicast address. One or more of the multicast frames may be associated with one or more different streams, such as streams having a different traffic identifier (or a different class of traffic). One or more of the registered electronic devices may receive one or more of the multicast frames and may transmit a corresponding block acknowledgment, such as the block acknowledgment discussed further below with respect to FIG. 6.

The electronic device 102A may receive one or more block acknowledgments from the one or more registered electronic devices and may update the corresponding data structure accordingly (306). If one or more of the registered electronic devices did not receive a particular multicast frame for a particular traffic identifier, the electronic device 102A may, for example, retransmit the multicast frame for the particular traffic identifier, such as via a unicast transmission and/or via a multicast transmission. In one or more implementations, a block acknowledgment from a registered device may indicate, for each stream, which frames were received by the device and/or which frames were not received by the device. For example, the frames may include sequence numbers from which the electronic device can determine whether one or more frames were not received.

Thus, conversely, an electronic device registered for a multicast transmission may receive, from a transmitting electronic device, a block acknowledgement request frame for the multicast transmission that indicates the different streams to be included in at least a portion of the multicast transmission, as well as a set of frames to be transmitted for each stream. The electronic device may then receive one or more (or none) of the set of frames for each stream, and may subsequently generate and transmit a block acknowledgment for the multicast transmission which indicates whether one or more frames of each stream was received by the electronic device. The transmitting electronic device may receive the block acknowledgment and retransmit any frames that were not received.

Figure 4:
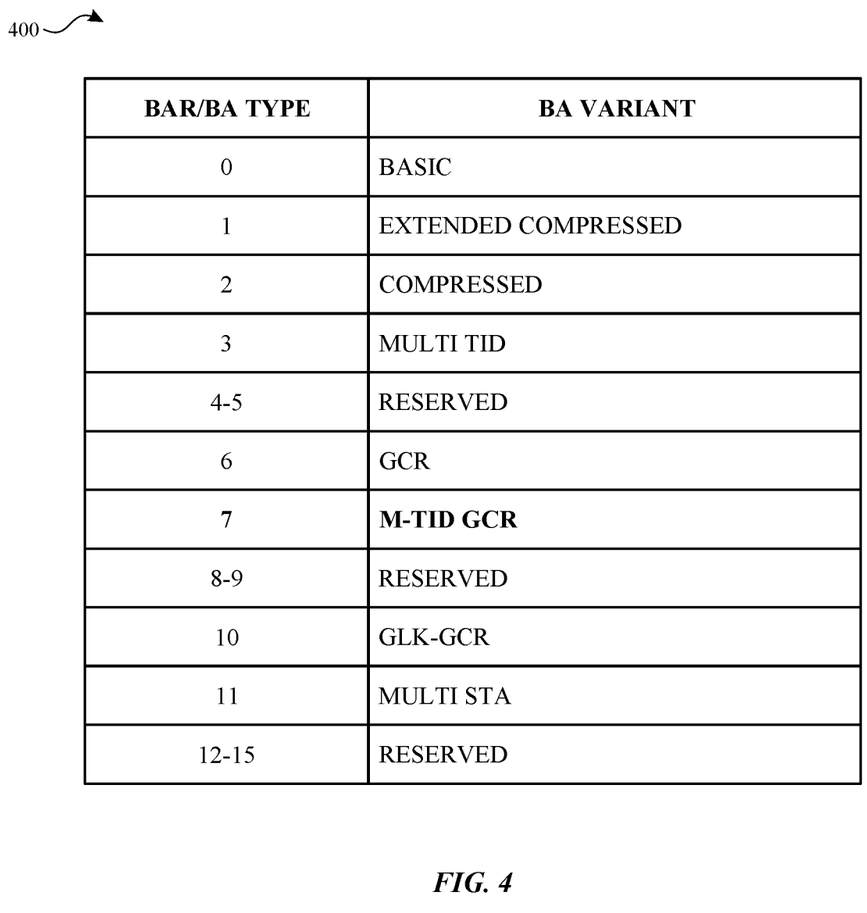
FIG. 4 illustrates an example block acknowledgment type table in accordance with one or more implementations.

FIG. 4 illustrates an example block acknowledgment type table 400 in accordance with one or more implementations. As shown in the table 400, a block acknowledgment request/block acknowledgment type identifier of 7 may be used to identify a block acknowledgment request/block acknowledgement for a multicast transmission that includes multiple concurrent streams. However, in one or more implementations, any of the reserved identifiers, such as 4, 5, 8, 9, or 12-15 may be used and/or any existing identifier may be repurposed. As is discussed further below with respect to FIGS. 5 and 6, the block acknowledgement identifier may be included in block acknowledgement requests and/or block acknowledgments.

Figure 5:
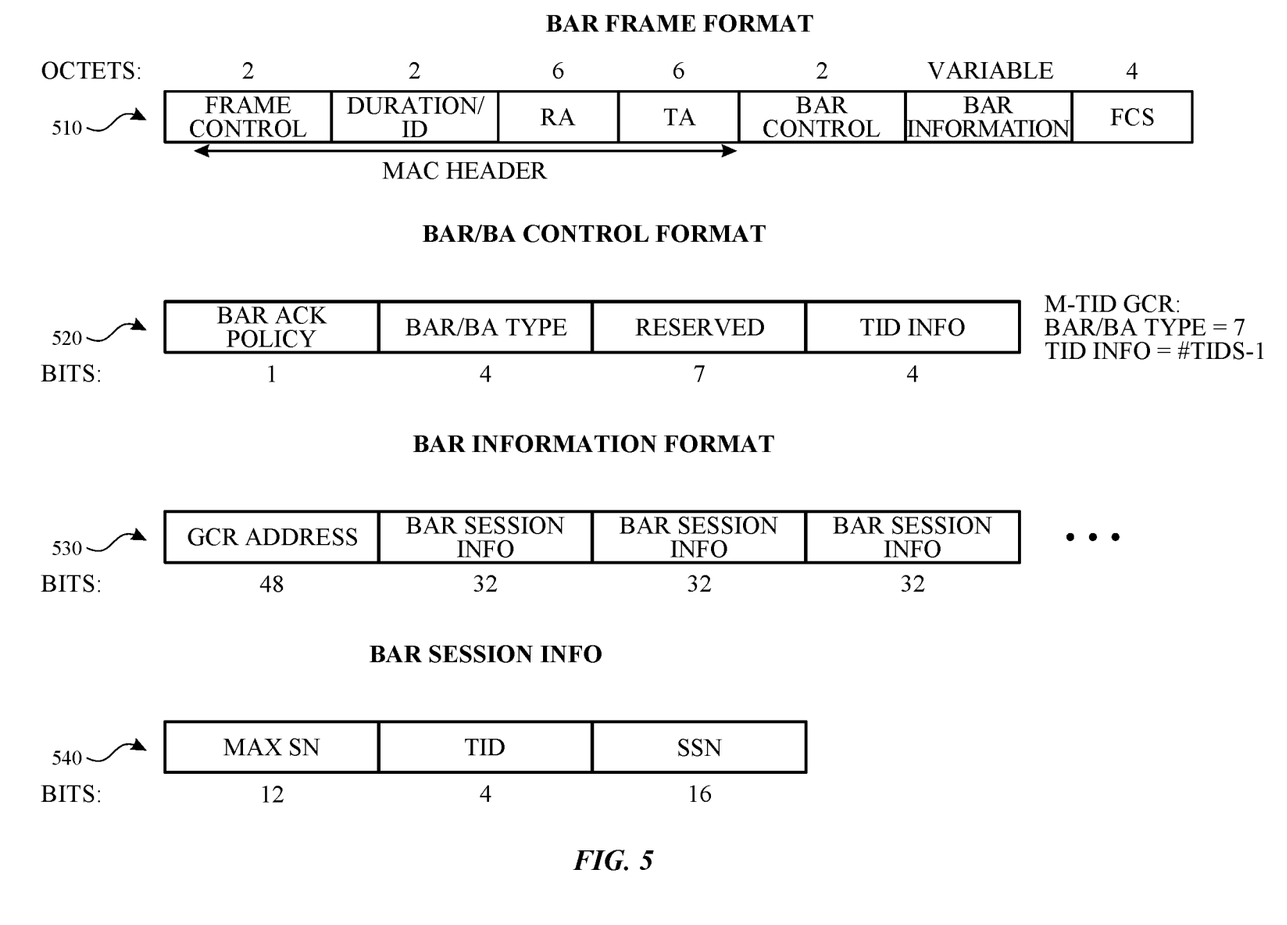
FIG. 5 illustrates an example block acknowledgment request frame format in accordance with one or more implementations.

FIG. 5 illustrates an example block acknowledgment request frame format in accordance with one or more implementations. Not all of the depicted frame components may be used in all implementations, however, and one or more implementations may include additional or different frame components than those shown in the figure. Variations in the arrangement and type of the frame components may be made without departing from the spirit or scope of the claims as set forth herein. Additional frame components, different frame components, or fewer frame components may be provided.

As shown in FIG. 5, a block acknowledgment request frame 500 may include a control section 520 and an information section 530, and the information section 530 may include one or more session info sections 540. The control section 520 may include a type field set to, for example 7 (or any pre-determined value), and a TID info field that indicates the number of traffic identifiers in the multicast session (e.g., indicated by the number of TIDs minus 1).

The information section 530 may include the GCR (or multicast) address and the one or more session info sections 540. A session info section 540 may include a traffic (e.g., stream) identifier, a starting sequence number, and a maximum sequence number. The sequence numbers may correspond to the packet (or frame) sequence numbers for which the block acknowledgement is being requested for that particular traffic identifier, such as the starting, or first sequence number, and the maximum, or last sequence number. Thus, the difference between the maximum sequence number and the starting sequence number may indicate the number of frames to be transmitted for the given traffic identifier.

Thus, an electronic device may generate and transmit a block acknowledgment request frame for subsequent concurrent multicast transmissions across multiple different traffic identifiers, where the block acknowledgment request frame includes a respective session info section 540 corresponding to each respective traffic identifier of each multicast transmission. A respective session info section 540 for a given traffic identifier may indicate the starting sequence number and the maximum sequence number for the corresponding subsequent multicast transmission. In this manner, an electronic device receiving the block acknowledgment request frame can determine which (if any) frames for each multicast transmission were not received, such as any frames that were not received having a sequence number between the starting sequence number and the maximum sequence number indicated in the bar session info section 540 for the corresponding traffic identifier.

Figure 6:
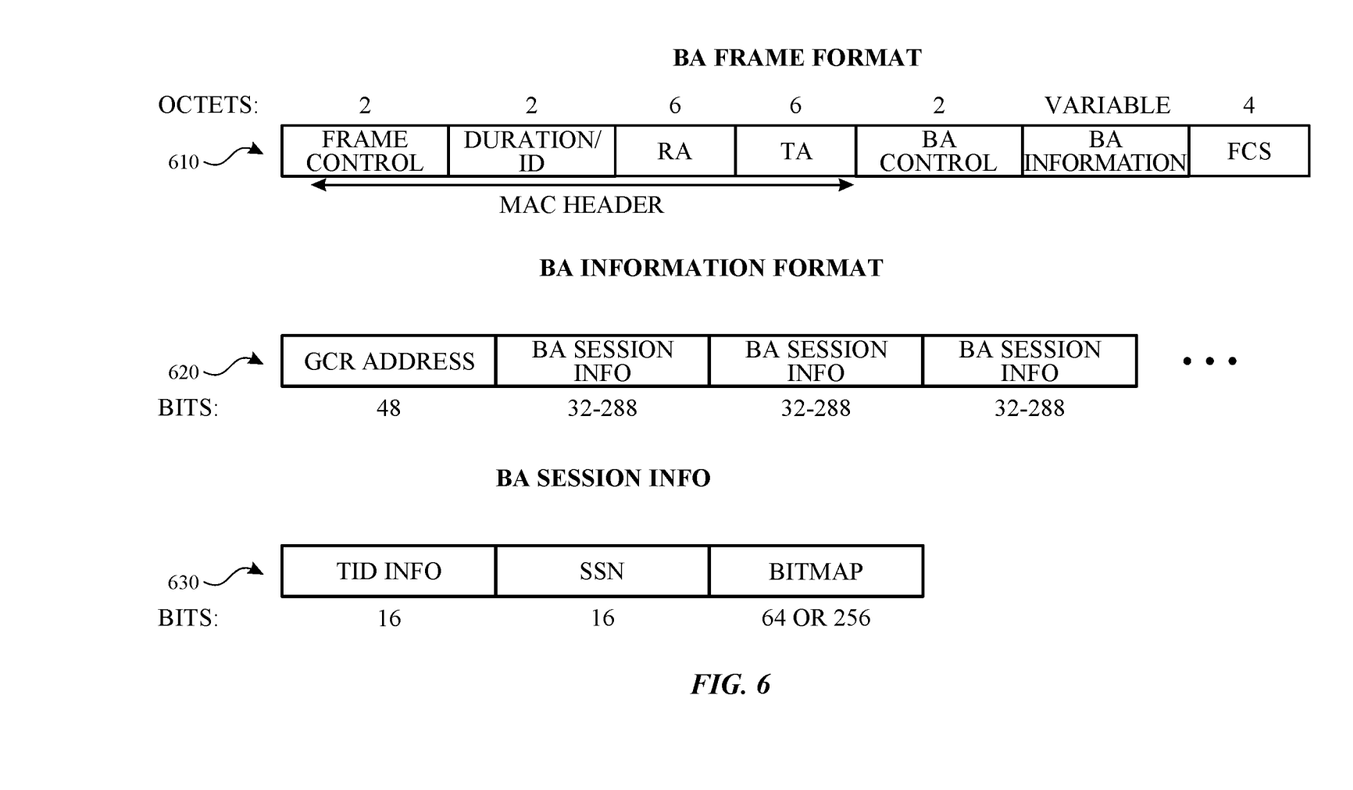
FIG. 6 illustrates an example block acknowledgment frame format in accordance with one or more implementations.

FIG. 6 illustrates an example block acknowledgment frame format in accordance with one or more implementations. Not all of the depicted frame components may be used in all implementations, however, and one or more implementations may include additional or different frame components than those shown in the figure. Variations in the arrangement and type of the frame components may be made without departing from the spirit or scope of the claims as set forth herein. Additional frame components, different frame components, or fewer frame components may be provided.

As shown in FIG. 6, a block acknowledgment frame 600 may include a control section and an information section 620, and the information section 620 may include one or more session info sections 630. In one or more implementations, a block acknowledgment frame 600 generated by an electronic device may correspond to a block acknowledgment request frame 500 received by the electronic device.

The information section 620 may include a GCR (e.g., multicast) address corresponding to the block acknowledgment, and one or more session info sections 630. A session info section 630 may include a traffic (stream) identifier, a starting sequence number, and a bitmap. The starting sequence number may correspond to the sequence number of the first packet for the traffic identifier for the block acknowledgment, and the bitmap may include a bit set to, for example, 0 or 1 to indicate whether a corresponding packet was received. For example, the first bit in the bitmap may correspond to the packet with the indicated starting sequence number and each subsequent bit may correspond to each subsequent sequence numbered packet.

Figure 7:
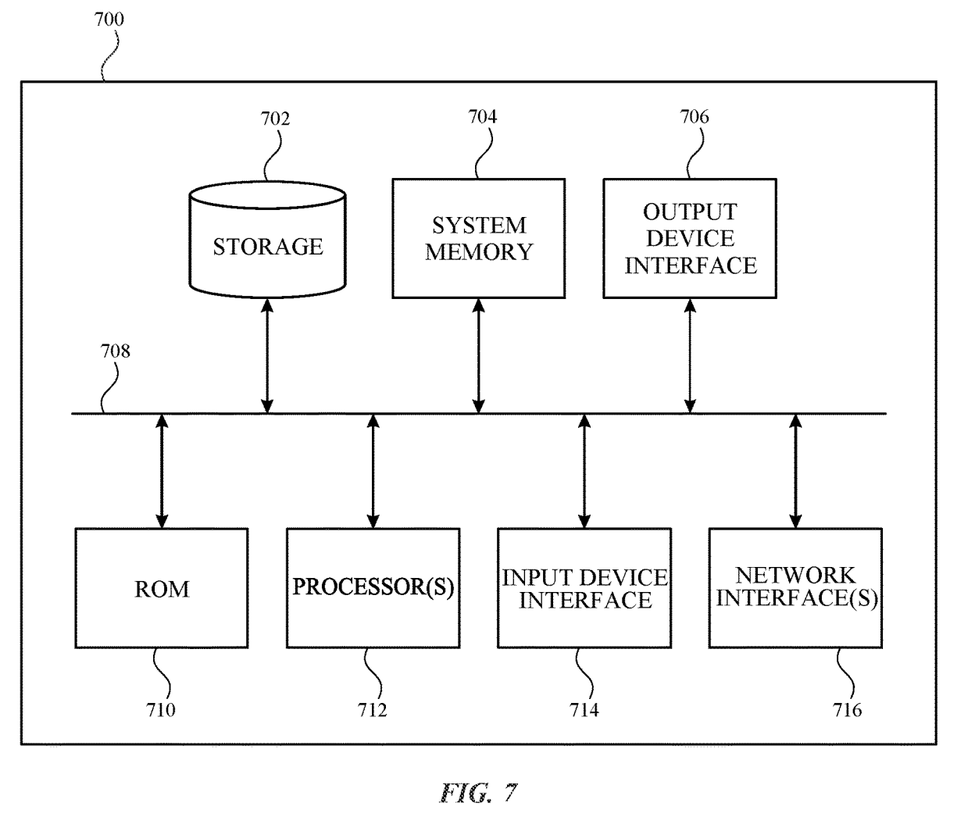
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102A-C, the wireless access point 104, and/or the base station 106 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

As described above, an aspect of the present technology may be the gathering and use of data available from specific and legitimate sources to improve the present technology. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A baseband processor comprising:
    processing circuitry configured to:
        prepare, for transmission, a block acknowledgment request associated with a multicast transmission, the multicast transmission comprising a first stream and second stream, wherein the block acknowledgement request comprises a first starting sequence number and a first maximum sequence number that indicate a first set of frames corresponding to the first stream and the block acknowledgment request comprises a second starting sequence number and a second maximum sequence number that indicate a second set of frames corresponding to the second stream;
        after transmission of the block acknowledgement request, prepare, for transmission, the multicast transmission comprising the first and second streams; and
        receive a block acknowledgement response for the multicast transmission from an electronic device, wherein the block acknowledgment response indicates whether one or more of the first set of frames and one or more of the second set of frames were received by the electronic device; and
    interface circuitry coupled with the processing circuitry, the interface circuitry to communicatively couple the processing circuitry to a component of a device.

2. The baseband processor of claim 1, wherein the first and second streams are identified in the block acknowledgment request, and the block acknowledgment response, by first and second traffic identifiers respectively.

3. The baseband processor of claim 2, wherein the first and second traffic identifiers correspond to first and second quality of service traffic classes.

4. The baseband processor of claim 2, wherein the multicast transmission comprises a groupcast with retries transmission.

5. The baseband processor of claim 1, wherein the block acknowledgment response indicates that one of the first set of frames or one of the second set of frames was not received, and the processing circuitry is further configured to:
    prepare, for retransmission, the one of the first set of frames or the one of the second set of frames.

6. The baseband processor of claim 5, wherein the one of the first set of frames or the one of the second set of frames is retransmitted via a unicast transmission.

7. The baseband processor of claim 1, wherein the processing circuitry is further configured to:
    receive another block acknowledgement response associated with the multicast transmission from another electronic device, wherein the block acknowledgment response indicates whether one or more of the first set of frames and one or more of the second set of frames were received by the other electronic device.

8. The device of claim 1, wherein the block acknowledgement response indicates whether the first set of frames of the first stream, from the first starting sequence number to the first maximum sequence number, were received by the electronic device and the block acknowledgment response indicates whether the second set of frames of the second stream, from the second starting sequence number to the second maximum sequence number, were received by the electronic device.

9. A method comprising:
    receiving, by a first electronic device from a second electronic device, a block acknowledgment request associated with a multicast transmission, the multicast transmission comprising a first stream and second stream, wherein the block acknowledgement request comprises a first starting sequence number and a first maximum sequence number that indicate a first set of frames corresponding to the first stream and the block acknowledgment request comprises a second starting sequence number and a second maximum sequence number that indicate a second set of frames corresponding to the second stream;
    receiving, by the first electronic device, one or more of the first or second set of frames of the multicast transmission comprising the first and second streams; and
    transmitting, by the first electronic device, a block acknowledgement response associated with the multicast transmission, wherein the block acknowledgement response indicates whether one or more of the first set of frames and one or more of the second set of frames were received.

10. The method of claim 9, wherein the first and second streams correspond to first and second quality of service traffic classes, respectively.

11. The method of claim 9, wherein the multicast transmission comprises a groupcast with retries transmission.

12. The method of claim 9, wherein the block acknowledgment response indicates that one of the first set of frames or one of the second set of frames was not received, and the method further comprises:
    receiving the one of the first set of frames or the one of the second set of frames via a unicast retransmission.

13. A non-transitory machine-readable medium comprising instructions that, when executed by one or more processors, cause the one or more processors to perform operations comprising:
    transmitting, by a first electronic device, a block acknowledgment request associated with a multicast transmission, the multicast transmission comprising a first stream and second stream, wherein the block acknowledgement request comprises a first starting sequence number and a first maximum sequence number that indicate a first set of frames corresponding to the first stream and the block acknowledgment request comprises a second starting sequence number and a second maximum sequence number that indicate a second set of frames corresponding to the second stream;

transmitting, by the first electronic device, the multicast transmission comprising the first and second streams; and receiving, by the first electronic device and from a second electronic device, a block acknowledgement response associated with the multicast transmission, wherein the block acknowledgment response indicates whether one or more of the first set of frames and one or more of the second set of frames were received by the second electronic device.

14. The non-transitory machine-readable medium of claim 13, wherein the first and second streams are identified in the block acknowledgment request, and the block acknowledgment response, by first and second traffic identifiers respectively.

15. The non-transitory machine-readable medium of claim 14, wherein the first and second traffic identifiers correspond to first and second quality of service traffic classes.

16. The non-transitory machine-readable medium of claim 14, wherein the multicast transmission comprises a groupcast with retries transmission.

17. The non-transitory machine-readable medium of claim 13, wherein the block acknowledgment response indicates that one of the first set of frames or one of the second set of frames was not received by the second electronic device, the operations further comprising:

retransmitting the one of the first set of frames or the one of the second set of frames.

18. The non-transitory machine-readable medium of claim 17, wherein the one of the first set of frames or the one of the second set of frames is retransmitted via a unicast transmission.

19. The non-transitory machine-readable medium of claim 13, wherein the operations further comprise:

receiving, by the first electronic device from a third electronic device, another block acknowledgement response for the multicast transmission, wherein the other block acknowledgment response indicates whether one or more of the first set of frames and one or more of the second set of frames were received by the third electronic device.

20. The non-transitory machine-readable medium of claim 13, wherein the block acknowledgement response indicates whether the first set of frames of the first stream, from the first starting sequence number to the first maximum sequence number, were received by the second electronic device and the block acknowledgment response indicates whether the second set of frames of the second stream, from the second starting sequence number to the second maximum sequence number, were received by the second electronic device.

* * * * *

UNITED STATES PATENT AND TRADEMARK OFFICE
CERTIFICATE OF CORRECTION

PATENT NO. : 12,323,249 B2
APPLICATION NO. : 18/616003
DATED : June 3, 2025
INVENTOR(S) : Yoel Boger et al.

Page 1 of 1

It is certified that error appears in the above-identified patent and that said Letters Patent is hereby corrected as shown below:

In the Claims

Column 14; Line No. 9 (Claim 8): Replace "The device of claim 1," with --The baseband processor of claim 1,--.

Signed and Sealed this
Twenty-sixth Day of August, 2025

Coke Morgan Stewart
*Acting Director of the United States Patent and Trademark Office*